United States Patent Office 3,224,962
Patented Dec. 21, 1965

3,224,962
SULFIDE TREATMENT OF REFORMING
CATALYST
Douglas Baldwin, Jr., Genoa, Tex., assignor to Shell Oil
Company, New York, N.Y., a corporation of Delaware
No Drawing. Filed July 27, 1962, Ser. No. 213,029
1 Claim. (Cl. 208—138)

This invention relates to a method for avoiding the formation of heat fronts in the catalyst bed of a reactor which is being brought on stream at reforming temperatures. More particularly this invention relates to a special sulfide treatment of reforming catalyst prior to contacting the catalyst with hydrocarbon at reforming temperatures.

The reforming of naphtha with a platinum catalyst such as platinum on halogenated alumina is now a well established and practiced process. In the reforming process a hydrocarbon fraction containing naphthenes and paraffins and boiling in the gasoline boiling range, e.g. about 180°–390° F., is contacted in the vapor phase and in the presence of a substantial pressure of hydrogen with a platinum catalyst at a temperature of about 800°–1000° F., whereby a product of improved octane number is obtained.

In platinum reforming the main reactions leading to improvement in octane number of the hydrocarbon fraction are the dehydrogenation and dehydroisomerization of naphthenes and dehydrocyclization of paraffins to aromatic hydrocarbons and the hydrocracking of low octane normal paraffin. Minor reactions which also occur are the isomerization of normal paraffins and some condensation reactions.

In platinum reforming, a particularly difficult problem encountered has been the formation of heat fronts or hot spots which pass through a catalyst bed when new or freshly regenerated platinum catalyst initially comes in contact with hydrocarbon at reforming temperatures. Heat fronts are normally encountered when hydrogen rich recycle gas containing substantial amounts of ethane and heavier hydrocarbons and/or the naphtha feed initially contacts the catalyst. These heat fronts are attributed to hyperactivity of the catalyst which causes excessive hydrocracking of the hydrocarbon, which is sometimes referred to as "runaway hydrocracking." These heat fronts are undesirable since high catalyst temperatures encountered often result in damage to the catalyst. Moreover, the hydrocracking reaction can cause excessive coke lay down on the catalyst with consequent catalyst deactivation.

In non-regenerative and semi-regenerative reforming operations, damaging heat fronts may be circumvented by introduction of hydrocarbon into the reactor at sufficiently low temperatures i.e. about 650° F. This procedure frequently is not desirable because it necessitates cooling the catalyst bed, which is time consuming, and can lead to scheduling problems. In fully regenerative operations where a freshly regenerated reactor is placed in the processing stream about every 1½ to 2 days, introduction of feed at a low temperature obviously is even more undesirable.

It is also known that pretreating fresh or regenerated catalyst with a sulfur compound prior to introduction of hydrocarbon into the reactor is effective in controlling runaway hydrocracking at reforming temperatures. For example, it has been suggested to conduct this sulfiding operation with about 0.2 to 2% mol of sulfur, in a free or combined form, in a non-reactive gas which is substantially free from uncombined hydrogen. However, such a treatment can lead to excessive sulfur addition to the catalyst, which may seriously reduce the initial catalyst selectivity ($C_5+$ reformate yield) and activity (temperature to maintain severity level). Exposure of catalyst to a sulfiding gas containing 1.1% mole hydrogen sulfide at 800° F. and 600 p.s.i.g. and at linear velocities of about 0.25 ft./min. for 3 hours is sufficient to provide 3.0% weight sulfur, calculated on the basis that all $H_2S$ is deposited on the catalyst. For a conventional commercially available reforming catalyst containing approximately 0.75% by weight platinum and 0.75% by weight halogen it is calculated that only 0.124% by weight sulfur is required to convert all the platinum metal to the sulfide form.

It has now been found that as little as 0.01–0.03% weight sulfur on platinum reforming catalyst is sufficient to prevent runaway hydrocracking if the entire catalyst bed is substantially uniformly contacted by using an extremely low sulfur concentration in the sulfiding gas and effecting the contacting at a high linear gas velocity.

By partially sulfiding the platinum catalyst under the special sulfiding conditions of the invention, excessive sulfur addition to the catalyst is avoided. Moreover, time required for the sulfiding operation is considerably reduced. This is important especially in fully regenerative reforming operations wherein a reactivated reactor must be taken out of service, regenerated, and returned to service in the matter of only a few hours. The sulfiding gas is a hydrogen-containing gas which is substantially free from ethane and heavier boiling hydrocarbons. The ethane and heavier hydrocarbon content of the gas should be at least less than 3% and preferably less than 2% by volume. Sulfur content, calculated as elemental sulfur, of the sulfiding gas should be from about 10 to 200 parts per million by weight and preferably from about 20 to 100 parts per million by weight. Any sulfur compound which is decomposable at the conditions of the sulfiding operations can be used. Suitable sulfur compounds are, for example, hydrogen sulfide, mercaptans, disulfides, carbon disulfide, and the like. By employing a hydrogen rich carrier gas for the sulfiding operation, reduction of the platinum on the catalyst is also effected while the catalyst is being partially sulfided. If desired, sulfiding operations can be effected with an inert gas as a sulfiding gas. With inert gas it is preferred to use hydrogen sulfide as the sulfur compound. If a decomposable sulfur compound such as mercaptan is used, sufficient hydrogen should be injected into the inert gas to react with the sulfur compound to produce hydrogen sulfide.

While the sulfiding operation can be conducted at any suitable pressure, e.g. from slightly above atmospheric pressure to operating pressure, the sulfiding gas velocity should be from about 4 to about 8 feet per minute. The velocity is calculated on the basis of gas at actual conditions of temperature and pressure and on the basis of no catalyst in the reactor vessel. The sulfiding treatment should be continued until substantial breakthrough of hydrogen sulfide occurs in the effluent gas. In many commercial size fully-regenerative type reforming units, the time required for sulfiding a catalyst bed is about 1–3 hours. With semi-regenerative type reforming units, wherein several reactors will be sulfided, longer times will, of course, be required.

With the special sulfiding conditions of the invention, the sulfur is dispersed more nearly uniformly throughout the entire catalyst bed while the time required for sulfiding is reduced. Uniform sulfiding of the catalyst bed is important, particularly when it is considered that the amount of sulfur deposited on the catalyst is quite low, e.g. about 0.01–0.03% w. Should the catalyst bed not be uniformly sulfided, runaway hydrocracking will occur in those portions of the catalyst bed wherein the catalyst has not been sulfided.

The process of the invention and its advantages will be shown in more detail in the following example.

EXAMPLE

A series of experiments was conducted in a test unit using a fixed bed of fresh commercially available reforming catalyst containing 0.75% w. platinum and 0.75% w. halogen on alumina. Axial thermocouples located in the center of the bed were used to obtain temperatures in the catalyst bed. In each experiment the fresh catalyst was treated with a mixture of $H_2S$ and hydrogen. The treatment was carried out at a temperature of 800°–980° F. and a pressure of 250 p.s.i.g.

Following the pretreatment, each catalyst was used to reform a straight-run naphtha fraction in tests of short duration at 250 p.s.i.g., 5 LHSV (liquid hourly space velocity), and a $H_2$/oil mole ratio of 6. Properties of the naphtha fraction are as follows.

```
Gravity, API at 60° F. _____ 51.3
Molecular wt. _____ 129
Sulfur, p.p.m. w. _____ <1
ASTM distillation, ° F.:
    I.B.P. _____ 259
    10% v. rec. at _____ 273
    50% v. rec. at _____ 297
    90% v. rec. at _____ 347
    E.P. _____ 379
Hydrocarbon type, percent v.:
    Paraffins _____ 40
    Naphthenes _____ 45
    Aromatics _____ 15
Octane No., research method:
    0 cc. TEL _____ 48
    3 cc. TEL _____ 73
```

Results of the experiments are given in Table 1 below. It can be seen that runaway hydrocracking was avoided by pretreating the catalyst with sulfur at low concentrations and high gas velocities whereas hydrocracking was obtained when low sulfur concentrations and low gas velocity was used, even for a longer period of time. Hydrocracking is indicated by the increase in temperature, maximum methane content of the effluent gas, and the high percentage of carbon on the catalyst.

Table 1

| No. | Pretreat ||| Reforming ||| Carbon on Catalyst, Percent w. |
|---|---|---|---|---|---|---|---|
| | $H_2S$ Content, p.p.m. w. | Gas Velocity, ft./min. | Sulfiding Time, Hr. | Inlet Temp., °F. | Max. Temp., °F. | Max. $CH_4$, Percent m. | |
| 1 | 2 | 1.2 | 2½ | 970 | 1,535 | 57 | 4.4 |
| 2 | 30 | 1.2 | 2½ | 940 | 1,440 | 54 | 3.4 |
| 3 | 20 | 4.9 | 1½ | 970 | 970 | 3 | 0.2 |
| 4 | 20 | 4.9 | 1½ | 1,000 | 1,000 | 4 | 0.3 |

In a similar experiment, fresh catalyst was pretreated for 2½ hours at 900° F. with nitrogen containing 100 p.p.m. w. sulfur at a linear velocity of 5.0 ft./min. When subjected to the short duration reforming test, no runaway hydrocracking was observed and carbon laydown on the catalyst was only 0.4% w.

In another experiment, fresh catalyst which had not been pretreated with sulfur was employed to reform a portion of naphtha which had been contaminated with 100 p.p.m. sulfur (as thiophene). Runaway hydrocracking was encountered in this experiment, which indicates that sulfur in the reforming feed with no sulfur pretreatment of the catalyst is also ineffective in preventing runaway hydrocracking.

In a further experiment, regenerated and reconditioned catalyst was used to reform the naphtha feed at 950° F. The catalyst contained 0.04% w. sulfur but was not pretreated. Hydrocracking occurred, resulting in a carbon laydown on the catalyst of 1.2% w. In experiments Nos. 3 and 4, wherein sulfur content of the pretreated catalyst was 0.01–0.03% w., the carbon laydown was appreciably less. Thus, even though regenerated catalyst may contain sulfur, the catalyst should be pretreated prior to use.

I claim as my invention:

In the reforming of naphtha with a platinum-containing catalyst wherein the catalyst is sulfided prior to contact with said naphtha to avoid excessive hydrocracking of the naphtha, the improvement which comprises partially sulfiding the catalyst with a sulfur-containing gas at a linear velocity of from 4 to 8 feet per minute, said gas being substantially free from ethane and higher boiling hydrocarbons and containing from about 10 to 200 parts per million by weight sulfur.

References Cited by the Examiner

UNITED STATES PATENTS

| | | | |
|---|---|---|---|
| 2,602,772 | 7/1952 | Haensel | 208—139 |
| 2,891,965 | 6/1959 | Voltz et al. | 252—439 |
| 2,964,480 | 12/1960 | Schwartz | 252—439 |

DELBERT E. GANTZ, *Primary Examiner.*

ALPHONSO D. SULLIVAN, *Examiner.*

H. LEVINE, *Assistant Examiner.*